(12) United States Patent
Carey et al.

(10) Patent No.: US 7,735,090 B2
(45) Date of Patent: Jun. 8, 2010

(54) ON DEMAND SOFTWARE CONTRACT MODIFICATION AND TERMINATION IN RUNNING COMPONENT ASSEMBLIES

(75) Inventors: James E. Carey, Rochester, MN (US); Scott N. Gerard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/304,131

(22) Filed: Dec. 15, 2005

(65) Prior Publication Data

US 2007/0168960 A1 Jul. 19, 2007

(51) Int. Cl.
*G06F 3/00* (2006.01)
*G06F 15/00* (2006.01)
*G06F 15/001* (2006.01)

(52) U.S. Cl. .............................. 719/310; 712/7; 712/8; 712/245

(58) Field of Classification Search ................ 719/310; 712/245, 8, 7
See application file for complete search history.

(56) References Cited

U.S. PATENT DOCUMENTS

| 5,604,910 | A | * | 2/1997 | Kojima et al. | 707/3 |
| 6,216,223 | B1 | * | 4/2001 | Revilla et al. | 712/245 |
| 7,464,009 | B2 | * | 12/2008 | Schwarzmann | 703/2 |
| 7,512,773 | B1 | * | 3/2009 | Shebanow et al. | 712/228 |

* cited by examiner

*Primary Examiner*—Lechi Troung
(74) *Attorney, Agent, or Firm*—Patterson & Sheridan, LLP

(57) ABSTRACT

A method, apparatus and article of manufacture to dynamically modify, terminate, or replace software components and connections (i.e., contracts) between components in a running assembly. Information about the component and contracts between components in a running assembly is used to determine an allowable sequence of management commands to transition the assembly of components from a current state to a specified goal state. At the same time, other components may continue to perform an operational workflow.

21 Claims, 9 Drawing Sheets

ACTIONS (MANAGEMENT COMMANDS) 600

610

| ROW | COMMAND NAME | COST | IF COMPONENT(S) = STATE | COMMAND TRANSITION |
|---|---|---|---|---|
| 1 | COMPONENT1.INIT | 1.0 | COMPONENT1 = OFF | COMPONENT1 = INIT |
| 2 | COMPONENT1.OFF | 1.0 | COMPONENT1 = INIT | COMPONENT1 = OFF |
| 3 | COMPONENT1.START | 1.0 | COMPONENT1 = INIT | COMPONENT1 = RUN |
| 4 | COMPONENT1.STOP | 1.0 | COMPONENT1 = RUN | COMPONENT1 = INIT |
| 5 | OLD1.INIT | 1.0 | OLD1 = OFF | OLD1 = INIT |
| 6 | OLD1.TERM | 1.0 | OLD1 = INIT | OLD1 = OFF |
| 7 | NEW1.INIT | 1.0 | NEW1 = OFF | NEW1 = INIT |
| 8 | NEW1.TERM | 1.0 | NEW1 = INIT | NEW1 = OFF |
| 9 | TABLE.INIT | 1.0 | TABLE = OFF | TABLE = INIT |
| 10 | TABLE.TERM | 1.0 | TABLE = INIT | TABLE = OFF |
| 11 | WIRE_OLD1.CONNECT | 1.0 | WIRE_OLD1 = OFF & OLD1 = OFF | WIRE_OLD1 = CONNECT; OLD1 = INIT; |
| 12 | WIRE_OLD1.DISCONNECT | 1.0 | WIRE_OLD1 = CONNECT & OLD1 = INIT | WIRE_OLD1 = OFF; OLD1 = OFF; |
| 13 | WIRE_OLD2.CONNECT | 1.0 | WIRE_OLD2 = OFF & TABLE = OFF | WIRE_OLD2 = CONNECT; TABLE = INIT; |
| 14 | WIRE_OLD2.DISCONNECT | 1.0 | WIRE_OLD2 = CONNECT & TABLE = INIT | WIRE_OLD2 = OFF; TABLE = OFF; |
| 15 | WIRE_NEW1.CONNECT | 1.0 | WIRE_NEW1 = OFF & NEW1 = OFF | NEW1 = INIT; WIRE_NEW1 = CONNECT; |
| 16 | WIRE_NEW1.DISCONNECT | 1.0 | WIRE_NEW1 = CONNECT & NEW1 = INIT | NEW1 = OFF; WIRE_NEW1 = OFF; |
| 17 | WIRE_NEW2.CONNECT | 1.0 | WIRE_NEW2 = OFF & TABLE = OFF | TABLE = INIT; WIRE_NEW2 = CONNECT; |
| 18 | WIRE_NEW2.DISCONNECT | 1.0 | WIRE_NEW2 = CONNECT & TABLE = INIT | TABLE = OFF; WIRE_NEW2 = OFF; |

*FIG. 6A*

REACTION RULES 600

| ROW | NAME | COST | IF COMPONENT(S) = STATE | TRANSITION |
|---|---|---|---|---|
| 1 | WIRE_OLD1.START | 1.0 | COMPONENT1 = RUN & WIRE_OLD1 = CONNECT & OLD1 = INIT | OLD1 = RUN ; |
| 2 | WIRE_OLD1.STOP | 1.0 | COMPONENT1 = INIT & WIRE_OLD1 = CONNECT & OLD1 = RUN | OLD1 = INIT ; |
| 3 | WIRE_OLD2.START | 1.0 | OLD1 = RUN & WIRE_OLD2 = CONNECT & TABLE = INIT | TABLE = RUN; |
| 4 | WIRE_OLD2.STOP | 1.0 | OLD1 = INIT & WIRE_OLD2 = CONNECT & TABLE = RUN | TABLE = INIT; |
| 5 | WIRE_NEW1.START | 1.0 | COMPONENT1 = RUN & WIRE_NEW1 = CONNECT & NEW1 = INIT | NEW1 = RUN; |
| 6 | WIRE_NEW1.STOP | 1.0 | COMPONENT1 = INIT & WIRE_NEW1 = CONNECT & NEW1 = RUN | NEW1 = INIT; |
| 7 | WIRE_NEW2.START | 1.0 | NEW1 = RUN & WIRE_NEW2 = CONNECT & TABLE = INIT | TABLE = RUN; |
| 8 | WIRE_NEW2.STOP | 1.0 | NEW1 = INIT & WIRE_NEW2 = CONNECT & TABLE = RUN | TABLE = INIT; |

| ROW # | CURRENT STATE 710 | | GOAL STATE 720 | |
|---|---|---|---|---|
| | COMPONENT | STATE | COMPONENT | STATE |
| 1 | COMPONENT1 | RUN | COMPONENT1 | RUN |
| 2 | WIRE_OLD1 | CONNECTED | WIRE_OLD1 | DISCONNECTED |
| 3 | OLD_1 | RUN | | OFF |
| 4 | WIRE_OLD2 | CONNECTED | WIRE_OLD2 | DISCONNECTED |
| 5 | STORAGE | RUN | | RUN |
| 6 | NEW_1 | OFF | NEW_1 | RUN |
| 7 | WIRE_NEW1 | DISCONNECTED | WIRE_NEW1 | CONNECTED |
| 8 | WIRE_NEW2 | DISCONNECTED | WIRE_NEW2 | CONNECTED |

FIG. 8

COMMAND SEQUENCE

| ROW | COMMAND ACTIONS 810 | REACTIONS 820 |
|---|---|---|
| 1 | COMPONENT_1.STOP | WIRE_OLD1.STOP; WIRE_OLD2.STOP; |
| 2 | WIRE_OLD1.DISCONNECT | |
| 3 | COMPONENT_1.START | WIRE_NEW1.START |
| 4 | WIRE_NEW1.CONNECT | |
| 5 | WIRE_OLD2.DISCONNECT | |
| 6 | WIRE_NEW2.CONNECT | WIRE_NEW2 |

{ 805 (rows 1-6)

ON DEMAND SOFTWARE CONTRACT MODIFICATION AND TERMINATION IN RUNNING COMPONENT ASSEMBLIES

BACKGROUND OF THE INVENTION

1. Field of the Invention

The present invention generally relates to computer software assemblies composed from a collection of independent software components. More specifically, the present invention relates to a method for dynamically modifying or replacing components in a running assembly.

2. Description of the Related Art

Software components have emerged as a software design methodology that borrows concepts from software patterns, object oriented design, and software frameworks. Generally, a software component is a unit of independent deployment that encapsulates a defined set of functions. For example, a component may provide a set of spell checking services to a word processing program. A party developing a word processing program may develop a spell checking component, or may obtain one from a third party. Because components may be deployed independently, the same component could provide spell checking services to an email program, or any other program that required these services. A common way to implement a component is as a class object using object-oriented programming languages such as C++, Java®, or Smalltalk, among others.

The functionality of a software component is specified by rules that describe an interface to the component, any preconditions that must be followed before invoking a particular function provided by the component, and any post conditions that will exist after a function is executed. A useful way to view these conditions is as a contract between a user of a component interface and a provider of an implementation of the interface (i.e., of a component). The contract states what the client must do to use the interface (preconditions), and states what the component must do to provide the services promised by the contract (post conditions).

In component based design, interconnections (or contracts) are formed between multiple components. An assembly of components may be "wired" together according to interface specifications and rules. A common contract is just an output "wire" that comes out of one component and is connected to the input "wire" of another component. Together, the components, and connections between components, form a working assembly. In composing a component assembly, a developer explicitly wires the components together so that each component operates correctly within the assembly as a whole. For example, the assembly may be "powered-up" or "powered-down" using a sequence of management commands hard coded into a particular assembly.

If the assembly is static, then connections may be formed when the components are wired together and do not change. In such a case, the component assembly functions as a single construct, wherein contract formation and the wiring between components are fixed as part of the assembly. In order to modify or change a component, the complete assembly must be shut down before any modifications may occur. Further, the sequence of management commands used to start or stop the assembly must be modified to reflect the change.

In a dynamic or on-demand assembly, the interconnections between different components may change while the assembly is running. Thus, contracts between different components may be formed and broken, perhaps many times. For example, consider a contract between a client component and a server component, where the client transfers data to the server, and then the server manipulates and returns the data. Each time the client transfers data to the server, a new contract is formed. Before a contract is terminated, the client may need to receive the current state of the data or need the server to certify that it has destroyed any copies of the data once it is returned. Simple contract time-outs are not sufficient.

Further, to change or modify the components of a dynamic assembly, information regarding each component of the assembly must be available. Each time a component modification or replacement is desired, an administrator must determine appropriate sequence of management commands to modify or replace a component. However, if performed incorrectly, the administrator may disrupt the assembly causing it to crash, or data to be lost.

Accordingly, there remains a need for a method for modifying or replacing components in a running assembly of software components.

SUMMARY OF THE INVENTION

Embodiments of the invention provide a method to dynamically modify, shutdown, remove, or replace components and connections (i.e., contracts) between components in a running assembly. Programmer-supplied information about the components and contracts in the assembly is used to safely and validly shutdown, modify or restart some components of a running assembly. While at the same time, other components may continue to perform an operational workflow.

One embodiment of the invention provides a method for managing the operational states associated with a plurality of software components. The method generally includes determining the software components included in a running assembly, wherein the assembly specifies connections among the software components, wherein each component includes a set of management commands used to modify the operational state of a respective component within the assembly, and wherein a first component further includes a reaction rule associated with one of the management commands that specifies an additional action to be performed when the management command is invoked for the first component. The method generally further includes determining a goal state for the assembly, wherein the goal state specifies a desired operational state for the components included in the assembly, and determining an allowable sequence management commands that will transition the operational state of each component to the desired operational state.

Another embodiment of the invention provides a computer readable medium containing a program which, when executed, performs an operation for managing the operational states associated with a plurality of software components. The operation generally includes determining the software components included in a running assembly, wherein the assembly specifies connections among the software components, wherein each component includes a set of management commands used to modify the operational state of a respective component within the assembly, and wherein a first component further includes a reaction rule associated with one of the management commands that specifies an additional action to be performed when the management command is invoked for the first component. The operation generally further includes determining a goal state for the assembly, wherein the goal state specifies a desired operational state for the components included in the assembly, and determining an allowable sequence management commands that will transition the operational state of each component to the desired operational state.

Another embodiment of the invention provides a computing device. The computing device generally includes a processor, and a memory configured to store an application that includes instructions, which when executed by the processor, cause the processor to perform operations for managing the operational states associated with a plurality of software components, comprising. The operations generally include determining the software components included in a running assembly, wherein the assembly specifies connections among the software components, wherein each component includes a set of management commands used to modify the operational state of a respective component within the assembly, and wherein a first component further includes a reaction rule associated with one of the management commands that specifies an additional action to be performed when the management command is invoked for the first component. The operations generally further include determining a goal state for the assembly, wherein the goal state specifies a desired operational state for the components included in the assembly, and determining an allowable sequence management commands that will transition the operational state of each component to the desired operational state.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this invention and should not, therefore, be considered limiting of its scope, for the invention may admit to other equally effective embodiments.

FIG. 6 illustrates a component state rules table for a connected assembly of software components, according to one embodiment of the invention.

FIG. 7 illustrates a current component state and a goal component state for the connected assembly of software components illustrated in FIG. 5.

FIG. 8 illustrates a management flow command sequence determined from individual component rules, according to one embodiment of the invention.

DETAILED DESCRIPTION OF THE PREFERRED EMBODIMENTS

Figure 1:
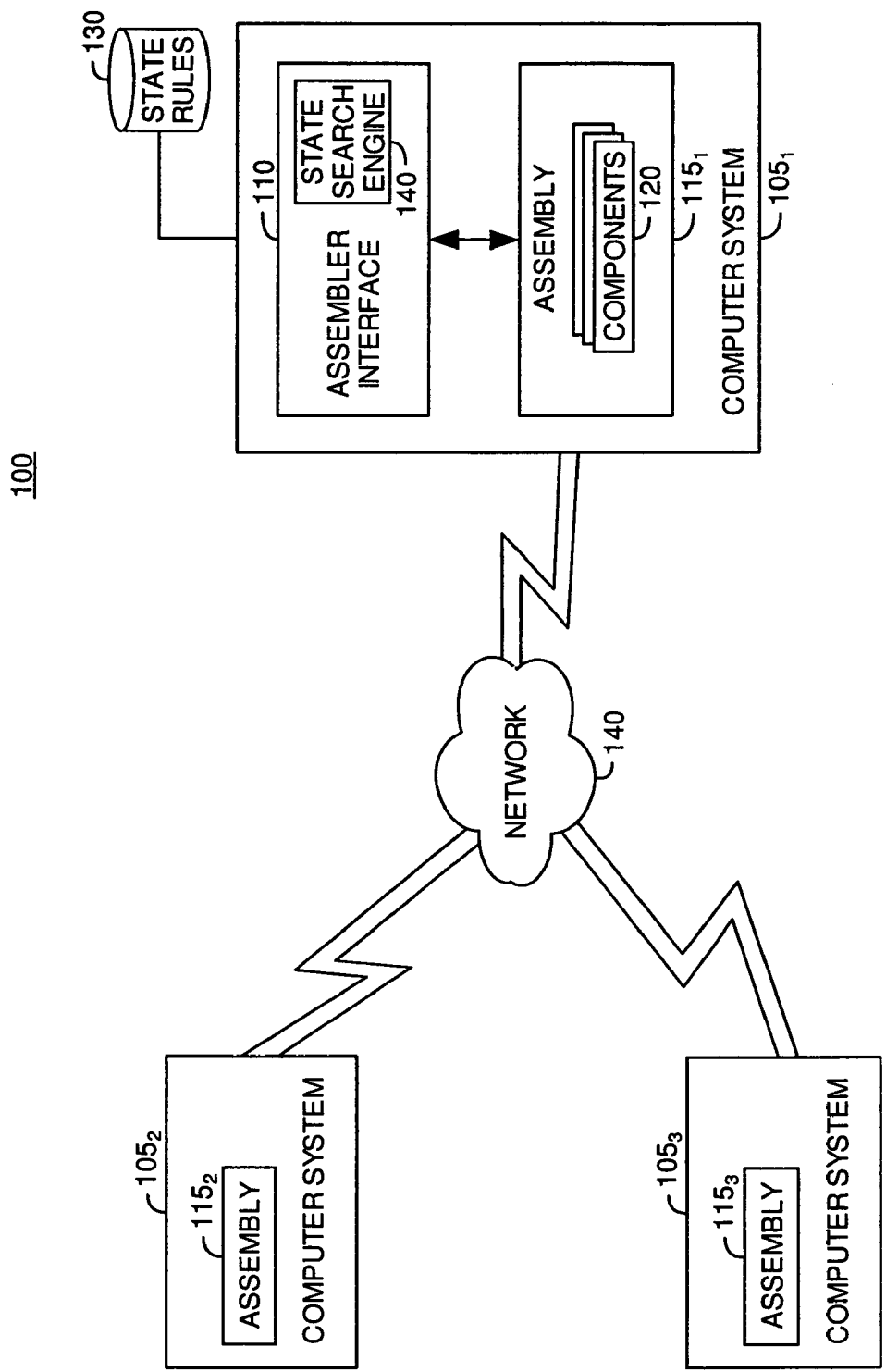
FIG. 1 is a block diagram illustrating logical and physical components of a computing environment, according to one embodiment of the invention.

Embodiments of the invention provide a method to dynamically modify or replace components, or connections between components (i.e., contracts), in a running software assembly. Each component includes a set of local rules associated with the component. Similarly, each connecting component (i.e., wire) includes a set of rules associated with the wire connection. In one embodiment, the rules define how a given component may be transitioned from one state to another state. An assembler component is configured to access the rules for all of the components included in an assembly. Using the full set of rules, the assembler may be configured to determine an allowable sequence of management commands to safely and validly shutdown, modify, restart, or replace one (or more) of the components within a running assembly, while simultaneously allowing other components to execute uninterrupted.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, any references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer systems shown in FIG. 1 and described below. The program product defines functions of the embodiments (including the methods) described herein and can be contained on a variety of computer-readable media. Illustrative computer-readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such computer-readable media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, application programs are described herein using discrete components interacting with one another. Those skilled in the art recognize, however, that different embodiments may combine or merge these components in many different ways.

FIG. 1 is a block diagram illustrating physical and logical components of a plurality of computer systems $105_{1-3}$. Each computer system 105 may include a physical collection of hardware resources such as one or more physical processors (CPUs), memory, network interfaces, and storage (e.g., IDE or SCSI disk systems). The software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available. Additionally, computer systems 105 may be configured to communicate with one another over network 140. Network 140 may be a local area network or a large wide area network, such as the Internet.

As illustrated, each computer system 105 includes an assembly 115. As used herein, an assembly 115 is a collection of software components 120 wired together to provide a connected operational flow. Each assembly 115 may provide an independent operational flow. Alternatively, the assemblies 115.1, 115.2 and 115.3 may provide a unified operational flow composed from the components running on each of the three computer systems 105. Generally, an operational flow describes any useful computational functions or processes obtained from the assembled components. That is, an operational flow describes how an assembly (e.g., assemblies 115.1, 115.2, and 115.3) performs an intended function using the components included in the assembly. Additionally, each component 120 may include a set of management commands that may be used to transition a given component 120 from one state to another. Management commands and component state transitions are discussed in greater detail below in reference to FIGS. 4-9.

In one embodiment, an assembler 110 may include a process or program that is configured to control a management flow for an assembly 115. A management flow describes changes in the operational state of a running assembly 115. Thus, the assembler 110 may be configured to invoke the management commands provided for a given component to change the operational state of an assembly 115.

Additionally, the assembler 110 has access to a collection of state rules 130 associated with the components 120. The state rules may specify how or when the management commands may be invoked to change the operational state of components 120. For example, the assembler 110 may include a state-space search engine 140. The state space search engine 140 may be configured to search for an allowable command sequence, based on the state rules 130, to transition the state of components 120 within the assembly 115 from a current state to a goal state. For example, to replace one component 120 in assembly 115, the assembler 110 may partially or completely shut down adjacent components, while other components in the assembly 115 are shut down only as far as necessary to make the replacement. Thus, embodiments of the invention may be used to replace some components 120 while others continue to perform an operational workflow. The rules included in state rules 130 may be provided as part of each component 120. Because the state rules 130 may depend on the set of components included in the assembly 115, changing the components may also change the rules included in state rules 130. Additionally, state rules 130 may include rules defined for the assembly 110 as a whole. For example, a rule may specify that a critical component may not be shut down during peak demand times.

In one embodiment, common state transactions may be determined and stored prior to an assembly 115 being put into production. For example, common assembly transitions include:
Global Start:
Start: all components off.
Goal: all components connected and running
Global Stop:
Start: all components connected and running.
Goal: all components off
Component swap:
Start: all old components connected and running
Goal: all old components disconnected and off, all new components connected and running In cases where the allowable sequence of management commands is not known in advance, however, the assembler 110 may be configured to perform a state space search using the rules 130. Doing so allows the assembler 110 to dynamically modify the state for a given assembly 115, without having to completely shut down each component, and without an administrator to attempt to determine an allowable sequence of management commands to effect a desired transition. As stated, to transition the assembly 115 to a goal state, the assembler 110 searches state rules 130 to identify an allowable command sequence between a start state (i.e., the current state of each component in assembly 115) and a goal state (i.e., a set of specified states for each component).

Figure 2:
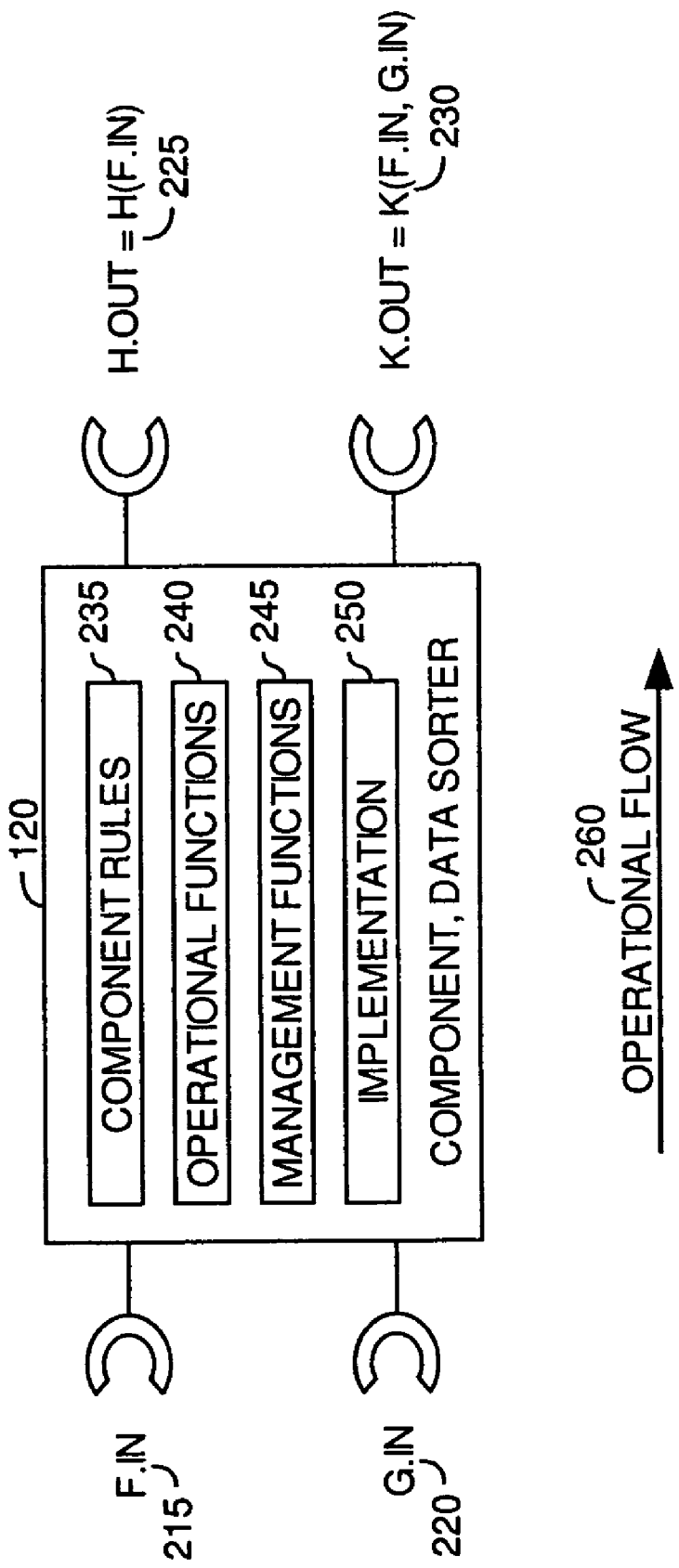
FIG. 2 is block diagram illustrating an embodiment of a reusable software component.

FIG. 2 is block diagram illustrating an embodiment of a reusable software component 120. In this example, the component 120 provides data sorting functions for data received over input connections "F.in" 215 and "G.in" 220. The component 120 also includes two output connections which provide a sorted "H.out" data flow 225, and a sorted "K.out" data flow 235. The "H.out" data flow 225 provides sorted data received from the "F.in" input connection 215, and the "K.out" data flow 230 provides a sorted output of data received over both input connections 215 and 220.

Operational functions 240 provide an interface to the sorting functions provided by the component 120. Component implementation 250 provides the operational logic that implements the operational functions 240 provided by the component 120. For example, implementation 250 may include a binary class object (or library) written using an object-oriented programming language such as C++, Java®, or Smalltalk, among others. However, procedural languages such as C, Pascal, and others may also be used.

Additionally, component 120 includes rules 235, and management functions 245. Rules 235 provided for the component 120 may be included in rules database 130, an example of which is described below in reference to FIG. 6. Management commands 245 may be used to transition the operational state of the component 120 from one state to another. For example, common operational states for a component 120 include:
OFF: The component is not initialized, no input is connected
INIT: The component has an input connected, and the component is initialized
RUN: The component is initialized, inputs are connected. Data is flowing into the component (e.g., over input connections 215 and 220), and data is flowing out of the component (e.g., over output connections 225 and 230).

In addition, a "wire" component used to connect two "operational" components may also have a "connected" state, meaning that an output connection from a first component is connected to the input connection of a second component. If the first component is also in a running state, then data flows over the connection to the second component. The above states, however, are not meant to be exhaustive. For example, the "INIT" state could be decomposed into an "INPUT CONNECTED" stated and a "COMPONENT INITIALIZED" state. Other variations and extensions to the operational states defined for a given component will readily occur to those of one of skill in the art for use in a particular embodiment, and are contemplated by the present invention.

Figure 3:
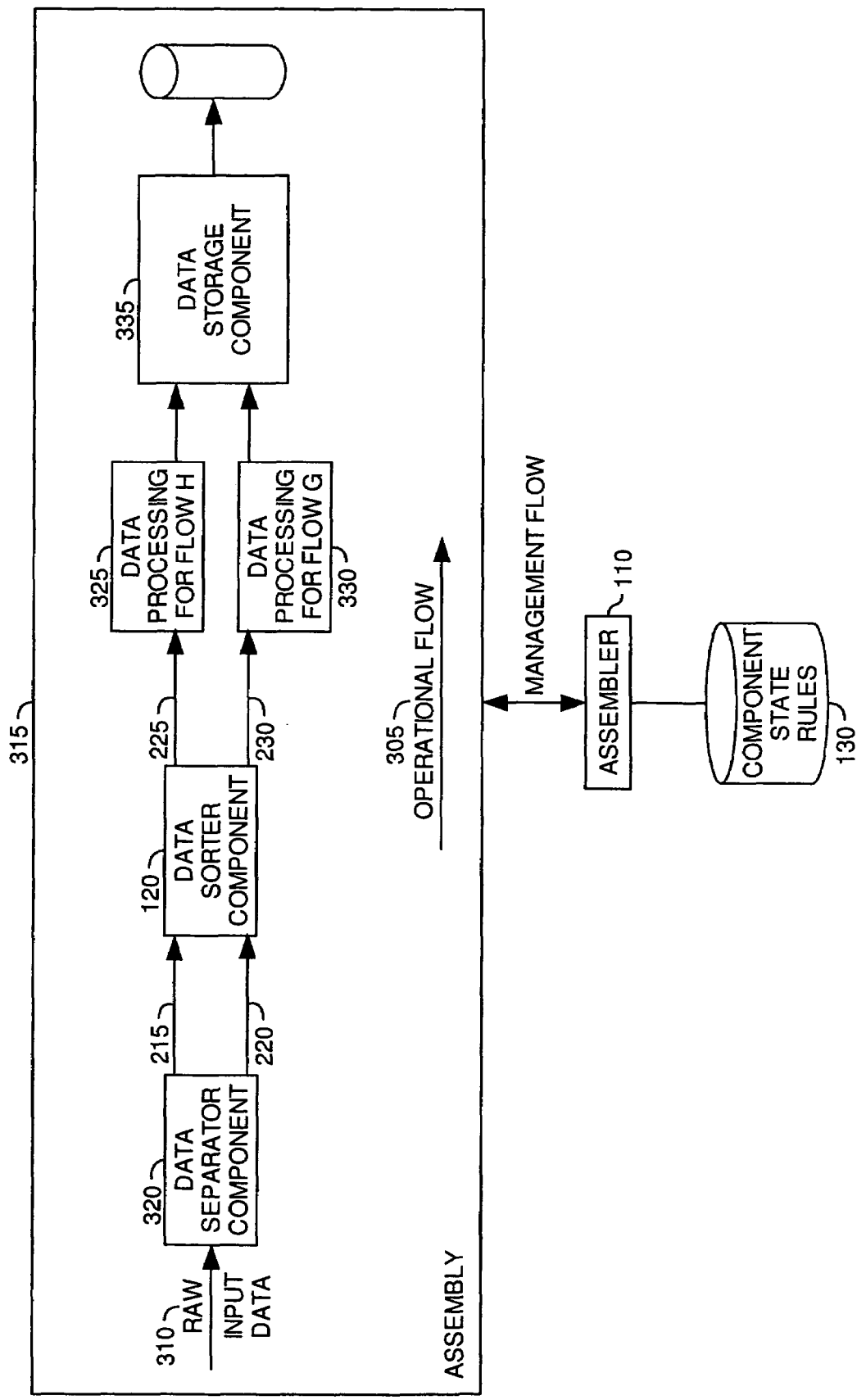
FIG. 3 illustrates an operational flow through a connected assembly of software components, according to one embodiment of the invention.

FIG. 3 illustrates a completed assembly 315 of components, including the component 120 illustrated in FIG. 2. In this example, the components provide an operational flow 305 configured to separate, sort, process, and store data received over input connection 310. Accordingly, assembly 315 includes a data separator component 320, a data sorter component 120, a first data processing component 325 (used to process data received over output 225), a second data processing component 330 (used to process data received over output 230), and data storage component 335. Once each of the components is initialized and transitioned to a running state, data flows through the assembly 315. In addition assembler 110 may be used to transition the components included in assembly 315 from one state to another (e.g., from a state where all of the components are in an "OFF" state to a state where all of the components are connected and in a "RUN" state.

In one embodiment, assembler 110 may be configured to search component state rules 130 to determine an allowable sequence of commands to effect such a transition. Further, as described in greater detail below, the assembler 110 may be configured to determine an allowable sequence of commands to modify or replace one or more of the components within a running assembly, without also having to shut down each individual component.

Figure 4:
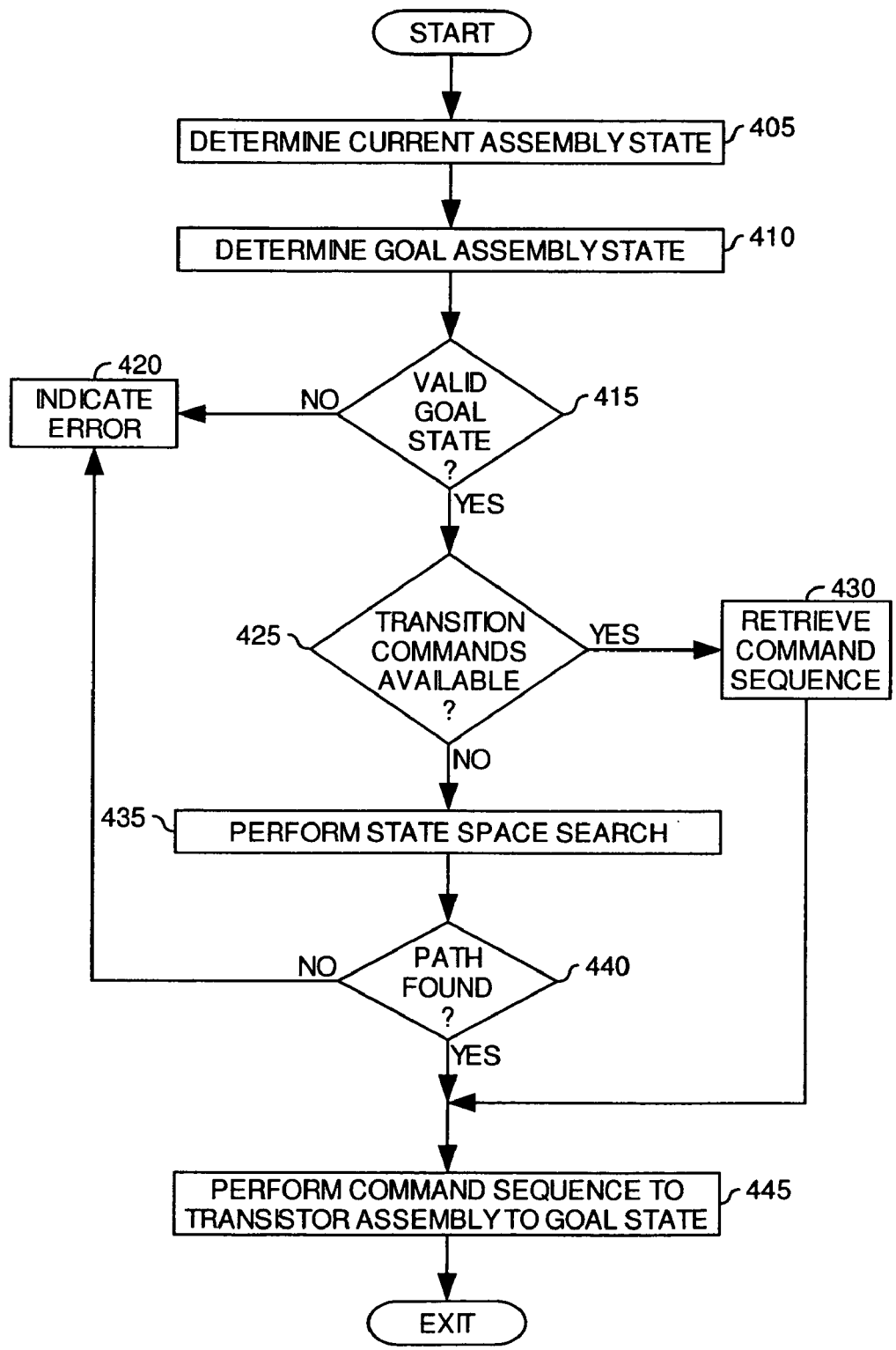
FIG. 4 illustrates a method for transitioning a running assembly of software components from an original state to a goal state, according to one embodiment of the invention.

FIG. 4 illustrates a method 400 for an assembler 110 to transition a running assembly of software components from an original state to a goal state, according to one embodiment of the invention. The operations of the method 400 are described in conjunction with FIGS. 5-9. At step 405, the assembler 110 determines the current state of each component in assembly. In one embodiment, the assembler 110 may maintain a state table that records the current state of each component in an assembly. Thus, at step 405, the assembler 110 may simply retrieve this information from a state table. At step 410, the assembler 110 retrieves a goal state for the assembly. For example, the assembler 110 may include a user-interface component that displays the components, and component states, of a running assembly. Such an interface may be configured to allow an administrator to specify a desired goal state. The goal state may modify the current state of some or all of the components in the assembly. For example, a goal state may replace components in the assembly with new components. Additionally, a desired goal state may add or remove components from the running assembly. The goal state for the assembly may also include a combination of new, replaced and/or removed components, each in the operational state specified by the goal state.

Figure 5:
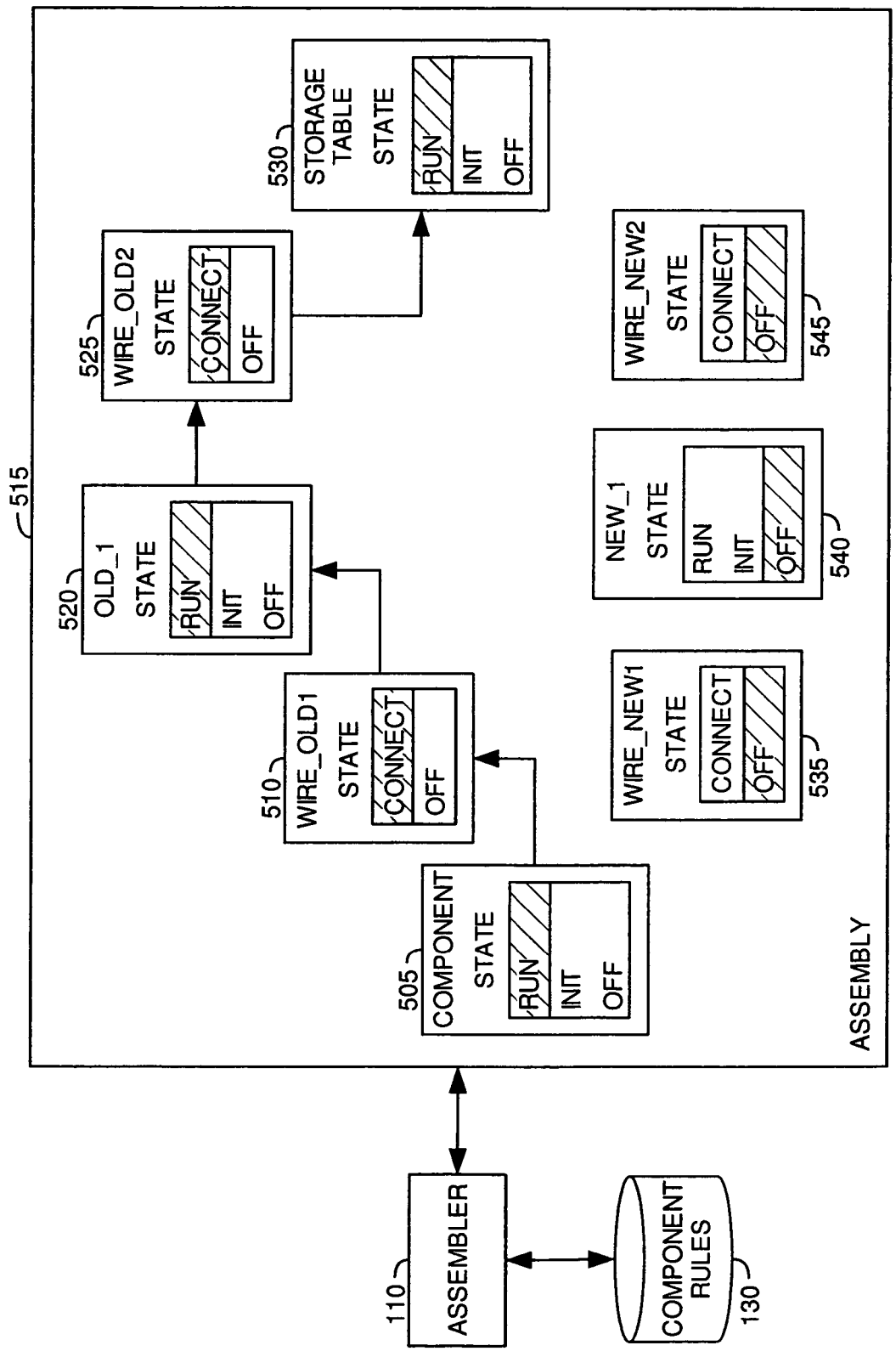
FIG. 5 illustrates a connected assembly of software components, according to one embodiment of the invention.

FIG. 5 illustrates a running assembly 515 that includes eight available components. Each component is illustrated to show its current operational state within the assembly 515. Specifically, component_1 505, old_1 525, and storage_component 530 are each shown in a "RUN" state, and wire components wire_old1 510 and wire_old2 525 are shown in a "CONNECTED" state. Wire_old1 510 connects the output of component_1 505 to the input of old_1 520. Similarly, wire_old2 525 connects the output of old_1 520 to the input of storage_component 530. Thus, collectively, components 505, 510, 520, 525, and 530 provide a running operational flow through assembly 515.

Additionally, assembly 515 includes three components that are not part of the current operational flow. Specifically, FIG. 5 illustrates three new components: wire_new1 and, wire_new2 545, both shown in a "DISCONNECTED" state, and component "new_1" 540, shown in an "OFF" state. New components may become available for a given assembly in a variety of ways. For example, new versions of a software component may become available after an initial version is released. Such a new version may correct "bugs," enhance existing performance, or add new features to an existing component. Further, the new components may become available for use in a given assembly 115 that may not be known (or even exist) at the time the original assembly is created.

In this example, the goal state specified at step 410 transitions the running assembly 515 from the one illustrated in FIG. 5 to one where the three new components 535, 540, and 545 are both connected to the assembly 515 and processing data as part of an operational flow. In other words, the goal state includes replacing the old_1 component 520 with the new_1 component 540, and replacing the connections provided by the old wire components 510 and 525 with connections provided by the new wire components 535 and 540. FIG. 7 illustrates a table 700 recording the current state of each component in assembly 515, and a corresponding goal state for each of the components.

Returning to the method 400 illustrated in FIG. 4, at step 415, the assembler 110 may be configured to determine whether a specified goal state is valid. For example, some transitions may not be allowed while a particular component is running (e.g., logging, or tracing components may be available to include in an operational flow only during periods of low activity). Additionally, for a given component 120, some transitions may be allowable only if the current state and goal states are compatible. Each of these conditions may be reflected in state rules 130 available to the assembler 115. Further, some goal states for the assembly 315 may not be "stable." That is, the state rules 130 may specify that invoking a particular management commands 245 may automatically trigger other commands to be performed (referred to herein as a "reaction rule"). Thus, an administrator may inadvertently specify an "unstable" goal state that will cause additional commands to occur, based on the reaction rules. Therefore, a valid goal state may be required to create an "equilibrium" with the state rules 130, where the "equilibrium" state will not automatically trigger any further commands to be invoked. Accordingly, at step 420, if an invalid goal state has been selected, the assembler 110 may indicate such an error. Alternatively, the assembler 110 may attempt to correct an "unstable" goal state by replacing it with a "stable" goal state.

In one embodiment, a "reaction rule" may specify one or more additional commands that should be performed in response to executing a given management command. For example, a "reaction" rule may be used to manage components within a running assembly when changing the operational state of one component may have an impact on other components. Consider a first component configured to receive data from an upstream component; simply shutting down the first component is inadequate, as the upstream component will continue to pass data to the one shut-down. In this case, a reaction rule associated with a "shut-down" management command for the first component could specify to invoke a "shut-down" management command for the upstream component. Alternatively, a reaction rule could specify management commands that cause a buffer component to be inserted in the assembly. The buffer component could be used to receive input data for the period that the first component is off-line.

Further, some reaction rules may be related to the existing operational flow in a running assembly when the management command is invoked. For example, one component may have a contract with another component to complete a specific operation with data received over an input path, or to destroy any copies of data received over the input path. In such as a case, a reaction rule for the "shut-down" command could cause the component to perform (or complete) operational functions, ensuring that it behaves according to its contracts with other components. Thus, a reaction rule may specify to invoke operational functions 240 and/or management commands 245 for the affected component, or for other components, and the reaction rule may also specify combinations thereof.

Returning to the method illustrated in FIG. 4, at step 425, the assembler 110 may determine whether an allowable sequence of commands is already available to transition the assembly 515 from a current state (determined at step 405) to a goal state (determined at step 410). As described above, common sequences, such as a global start up or shut down may be determined in advance. Accordingly, if such a sequence is available, it is retrieved at step 430, and at step 445 the assembler 110 performs the retrieved command sequence, transitioning the assembly 515 to the goal state.

If an allowable sequence of management commands is not available. Then at step 435, the assembler 110 may perform a state-space search of rules 130. In one embodiment, for example, the state-space search engine 140 may be configured to perform a best-first search of the state rules 130. As understood by one of ordinary skill in the art, a best first search is an algorithm that optimizes a depth-first search by expanding a promising "candidate" chosen according to some rule. Best-first search algorithms are often used for path finding in combinatorial searches. Examples of best-first search algorithms include the known Dijkstra's algorithm and A* search algorithm. However, embodiments of the invention may employ other known, or later developed, search techniques to determine an allowable sequence of management commands 245 that will transition the assembly 515 from a current state to a goal state.

FIG. 6 illustrates component state rules 130 for components included in assembly 515, according to one embodiment of the invention. Illustratively, state rules 130 are defined using both an "actions" table 610 and a "reactions" table 620. In one embodiment, state-space search rules 130 may define two types of rules; actions and reactions. First, the action rules are the explicit management commands 245 called by the assembler 110. Each rule provides a condition (or conditions) in column 640 specifying that if the component(s) associated with the rule is in the specified state in the column 640, then calling the particular command 245 will transition the component(s) to the state listed in column 650. For example, row 4 provides a rule for the "component_1" 505. This rule provides that if "component_1" 505 is in the "RUN" state, then invoking the "component_1.stop" command will transition component_1 to an "INIT" state. Similarly, row 2 provides that once "component_1" 505 is in the "INIT" state, the "component_1.off" command may be invoked to transition this component to an "OFF" state. Other rows of table 610 define rules 235 for the each of the components FIG. 5.

Additionally, reaction table 620 provides management commands 245 that may be invoked in response to one of the "actions" (i.e., table 620 defines the reaction rules for management commands 245). As described earlier, a reaction rule defines one or more commands that is invoked in response to performing an "action" command from table 610. For example, after the assembler 110 invokes the "component_1.stop" command, the operational state of assembly 515 will satisfy the conditions specified in reaction rules 2 and 4. Accordingly, the "wire_old1.stop" and "wire_old2.stop" commands will occur as a consequence of invoking the "component_1.stop" command, transitioning these two components to a "DISCONNECTED" state. These reaction commands 245 transition the "old_1" component 520 and the "table" component 530 to an "INIT" state. Doing so follows from the change in state to component_1 505; once component_1 505 is no longer processing data through the operational flow of the assembly 515, the downstream components will no longer be receive data and are automatically transitioned to the "INIT" state.

Additionally, as described above, some reactions may depend on the operational flow that exists for a given component when a management command is actually invoked. For example, shutting down (or partially shutting down) a data processing component may trigger a command to store any data currently being processed. Doing so would allow the component to restore an operational flow when the component is brought back on-line.

At step 435 of the method 400, the search engine 140 may progressively search through the rules 130 by selecting allowable actions, based on the current state of the assembly 515, determining what reactions will occur, and what state of the assembly 515 will result. This process may be repeated until the search engine 140 finds a sequence of commands that will transition the assembly 515 to the goal state. Additionally, each management command 245 is illustrated as having a "cost." In one embodiment, the state space search performed at step 435 may identify multiple sequences of commands that result in the goal state. The "cost" may be used to select between two or more sequences, or to prohibit a user from initiating a possible transition if the "cost" is above some selected threshold.

After performing the state-space search, at step 440, the assembler 110 may determine whether an allowable sequence of commands was identified in step 435. If not, method 400 may proceed to step 420 and indicate an error. Otherwise, at step 445 the assembler 110 invokes the sequence of commands determined by the state space search. For example, FIG. 8 illustrates a sequence 805 of management commands 245 determined from individual component rules 235, according to one embodiment of the invention. Specifically, rows 1-6 list a sequence of six commands 805 that the assembler 110 may invoke to transition the assembly 515 from the current state to the goal state, as specified in FIG. 6. In addition, the reactions that will be triggered for some of these management commands 245 are listed in column 820.

Figure 9:
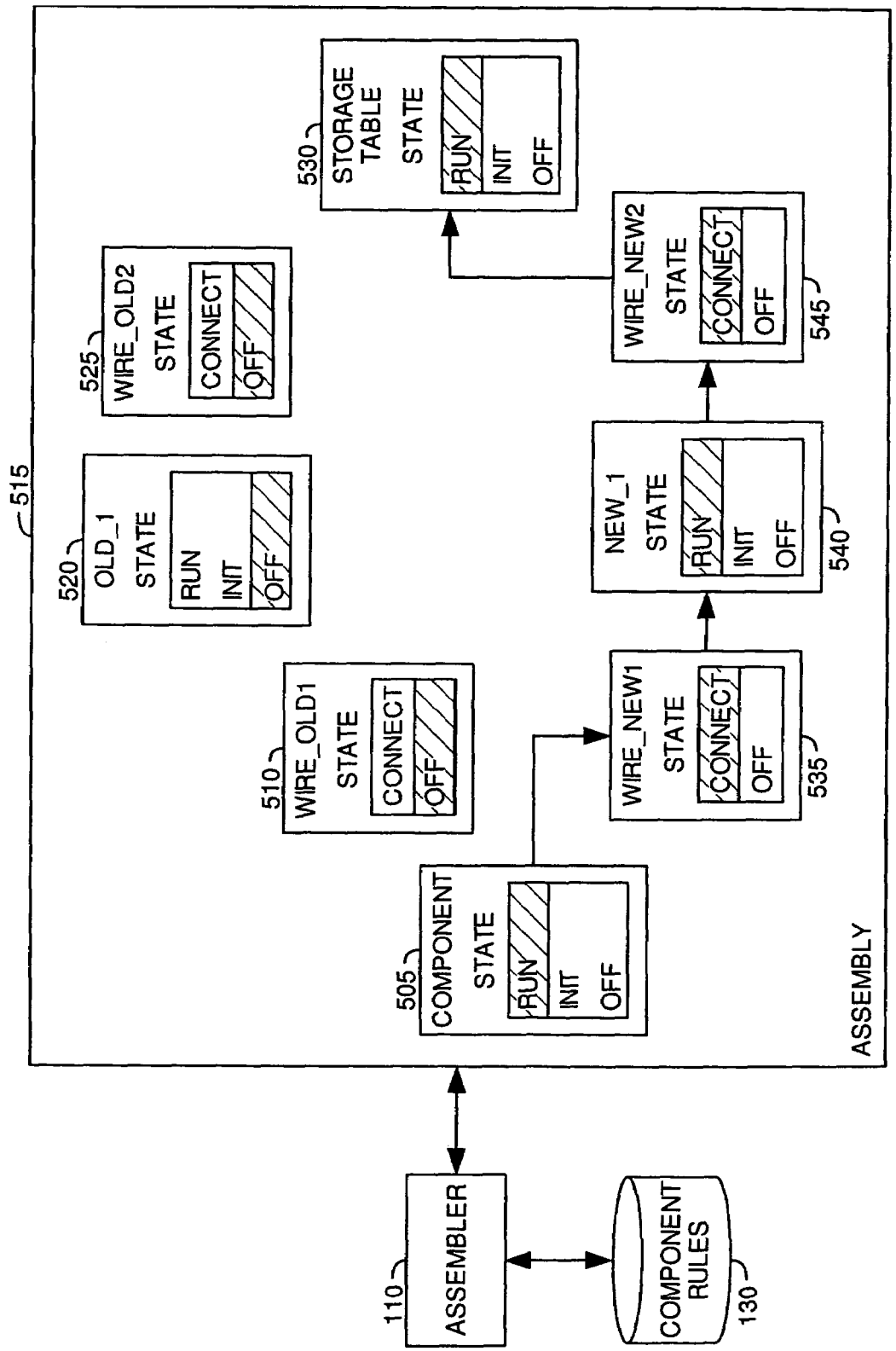
FIG. 9 illustrates the assembly of software components first illustrated in FIG. 5, after being transitioned from an original state to a goal state, according to one embodiment of the invention.

FIG. 9 is a block diagram illustrating the assembly of software components first illustrated in FIG. 5, after being transitioned from an original state to a goal state, according to one embodiment of the invention. Accordingly, the operational states shown for each of the components now corresponds to the states specified by the goal states in FIG. 6. Specifically, component old_1 525 is shown in an "OFF" state and wire components wire_old1 510 and wire_old2 525 are shown in a "DISCONNECTED" state. At the same time, wire_new1 535 now connects the output of component_1 505 to the input of component new_1 535. Similarly, wire_new2

525 now connects the output of component new_1 540 to the input of storage_component 530. Further, component_1 505, component new_1 540, and storage_component 530 are shown in a "RUN" state, and the wire components 535 and 545 are shown in a "CONNECTED" state. Thus, collectively, components 505, 535, 540, 545, and 530 now provide a running operational flow through assembly 515.

As described above, embodiments of the invention may be used to transition a running assembly of components from one state to another, and also to modify the components in a running assembly. In addition to replacing certain components, as done in the example described illustrated in FIGS. 4-9, embodiments of the invention may be used to dynamically modify the structure of a running assembly. For example, returning to the operational flow illustrated in FIG. 9, if after transitioning the assembly 515 to the new operational flow, an administrator observes that the "new_1" component 540 performs more slowly (but perhaps more accurately) than the "old_1" component 525, then a buffer component may be inserted between component 505 and component 535. To add the buffer to the running assembly 515, the assembler 110 would search for a valid sequence of commands to transition the affected components to an "INIT" or "OFF" state, disconnect the wire connections for these components, re-wire the components so that the operational flow passes through the buffer component, and restart the modified data flow. Furthermore, all of this may occur without an administer having to determine which management commands 245 must be invoked to accomplish the desired result. Thus, the administrator may focus on designing the best sequence of components required to perform a desired operational flow.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing a set of operational states associated with a plurality of software components executed on one or more processors, comprising:
   identifying the software components included in a running assembly, wherein the assembly specifies connections among the software components, wherein each component includes a set of management commands used to modify an operational state of a respective component within the assembly, and wherein a first component further includes a reaction rule associated with a first management command that specifies an additional action to be performed when the first management command is invoked for the first component;
   determining a goal state for the assembly, wherein the goal state specifies a desired operational state for the components included in the assembly, and wherein the goal state modifies a current operational state of one or more of the components in the assembly, replaces one or more components in the assembly, adds or removes at least one component from the assembly, or combinations thereof; and
   determining, by operation of the one or more computer processors, an allowable sequence of management commands needed to transition the operational state of each component to the desired operational state, wherein determining an allowable sequence of management commands comprises, determining two or more allowable sequences and selecting one of the allowable sequences based an a cost determined for each of the two or more allowable sequences.

2. The method of claim 1, further comprising, invoking the allowable sequence of management commands to transition the operational state of each component to the desired operational state.

3. The method of claim 1, wherein determining an allowable sequence of management commands comprises, performing a state-space search of the management commands.

4. The method of claim 3, wherein the state-space search comprises a best first search.

5. The method of claim 1, wherein the reaction rule specifies to invoke a second management command, in response to invoking the first management command.

6. The method of claim 1, wherein the reaction rule specifies to invoke at least one operational function associated with the first component, in response to invoking the first management command.

7. The method of claim 1, wherein prior to determining an allowable sequence of management commands, determining whether the goal state for the assembly is a valid goal state.

8. The method of claim 1, wherein a state rule for a given component specifies a required operational state in which the given component must exist in order to invoke a given management command.

9. A computer-readable storage medium containing a program, which when executed by one or more computer processors, performs an operation for managing a set of operational states associated with a plurality of software components, comprising:
   identifying the software components included in a running assembly, wherein the assembly specifies connections among the software components, wherein each component includes a set of management commands used to modify an operational state of a respective component within the assembly, and wherein a first component further includes a reaction rule associated with a first management command that specifies an additional action to be performed when the first management command is invoked for the first component;
   determining a goal state for the assembly, wherein the goal state specifies a desired operational state for the components included in the assembly, and wherein the goal state modifies a current operational state of one or more of the components in the assembly, replaces one or more components in the assembly, adds or removes at least one component from the assembly, or combinations thereof; and
   determining an allowable sequence of management commands needed to transition the operational state of each component to the desired operational state, wherein determining an allowable sequence of management commands comprises, determining two or more allowable sequences and selecting one of the allowable sequences based an a cost determined for each of the two or more allowable sequences.

10. The computer-readable storage medium of claim 9, wherein the operation further comprises, invoking the allowable sequence of management commands to transition the operational state of each component to the desired operational state.

11. The computer-readable storage medium of claim 9, wherein determining an allowable sequence of management commands comprises, performing a state-space search of the management commands.

12. The computer-readable storage medium of claim 11, wherein the state-space search comprises a best-first search.

13. The computer-readable storage medium of claim 9 wherein the reaction rule specifies to invoke a second management command, in response to invoking the first management command.

14. The computer-readable storage medium of claim 9 wherein the reaction rule specifies to invoke at least one operational function associated with the first component, in response to invoking the first management command.

15. The computer-readable storage medium of claim 9, wherein prior to determining an allowable sequence of management commands, determining whether the goal state for the assembly is a valid goal state.

16. The computer-readable storage medium of claim 9, wherein a state rule for a given component specifies a required operational state in which the given component must exist in order to invoke a given management command.

17. A computing device, comprising:
 a processor; and
 a memory configured to store an application that includes instructions which, when executed by the processor, cause the processor to perform operations for managing a set of operational states associated with a plurality of software components, comprising:
  identifying the software components included in a running assembly, wherein the assembly specifies connections among the software components, wherein each component includes a set of management commands used to modify an operational state of a respective component within the assembly, and wherein a first component further includes a reaction rule associated with a first management command that specifies an additional action to be performed when the first management command is invoked for the first component;
  determining a goal state for the assembly, wherein the goal state specifies a desired operational state for the components included in the assembly, and wherein the goal state modifies a current operational state of one or more of the components in the assembly, replaces one or more components in the assembly, adds or removes at least one component from the assembly, or combinations thereof; and
  determining, by operation of the one or more computer processors, an allowable sequence of management commands needed to transition the operational state of each component to the desired operational state, wherein determining an allowable sequence of management commands comprises, determining two or more allowable sequences, and selecting one of the allowable sequences based an a cost determined for each of the two or more allowable sequences.

18. The computing device of claim 17 wherein the reaction rule specifies to invoke a second management command, in response to invoking the first management command.

19. The computing device of claim 17 wherein the reaction rule specifies to invoke at least one operational function associated with the first component, in response to invoking the first management command.

20. The computing device of claim 17, wherein prior to determining an allowable sequence of management commands, determining whether the goal state for the assembly is a valid goal state.

21. The computing device of claim 17, wherein a state rule for a given component specifies a required operational state in which a given component must exist in order to invoke a given management command.

* * * * *